United States Patent [19]

Cote

[11] Patent Number: 4,748,899
[45] Date of Patent: Jun. 7, 1988

[54] DUAL-PRESSURE JACK

[75] Inventor: Daniel Cote, Ampuis Condrieu, France

[73] Assignee: Videocolor, Montrouge, France

[21] Appl. No.: 941,749

[22] Filed: Dec. 15, 1986

[30] Foreign Application Priority Data

Dec. 17, 1985 [FR] France .............................. 85 48698

[51] Int. Cl.$^4$ .............................................. F01B 31/14
[52] U.S. Cl. ...................................... 92/13.6; 92/13.1;
92/65; 92/110; 92/151; 92/84; 92/152; 91/189 R
[58] Field of Search ................. 92/65, 13.1, 13.6, 110,
92/151, 152, 84; 91/189 R

[56] References Cited

U.S. PATENT DOCUMENTS

| 2,661,599 | 12/1953 | Folmer | 92/110 |
|---|---|---|---|
| 2,851,994 | 9/1958 | Fagge | 92/152 |
| 2,891,513 | 6/1959 | Fagge | 92/84 |
| 2,938,996 | 5/1960 | Carswell | 92/84 |
| 2,944,525 | 7/1960 | Fagge | 92/152 |
| 2,982,257 | 5/1961 | Fagge | 92/152 |
| 3,269,275 | 8/1966 | Waite | 92/52 |
| 3,441,263 | 4/1969 | Burritt | 267/128 |
| 3,805,669 | 4/1974 | Mitchell | 92/13.1 |
| 3,968,735 | 7/1976 | Boisde et al. | 92/151 |
| 3,975,992 | 8/1976 | Cagle | 92/110 |
| 4,296,679 | 10/1981 | Mattsson | 92/65 |

FOREIGN PATENT DOCUMENTS 1565671 2/1970 Fed. Rep. of Germany .
2327488 12/1974 Fed. Rep. of Germany .
3430256 11/1985 Fed. Rep. of Germany .

Primary Examiner—Edward K. Look
Assistant Examiner—Thomas E. Denion
Attorney, Agent, or Firm—Oblon, Fisher, Spivak, McClelland & Maier

[57] ABSTRACT

The casing of the jack is divided into two cylinders by a cross partition, with a first piston which moves in one of the cylinders and a second piston, forming two parts, linked by a rod which crosses the partition to its first part which moves in the first cylinder-shaped piston and its second part which moves in the second cylinder of the jack. The fluid is conveyed selectively either to the cylinder formed by the first piston or to the second cylinder which communicates with the first cylinder through holes drilled in the partition.

5 Claims, 2 Drawing Sheets

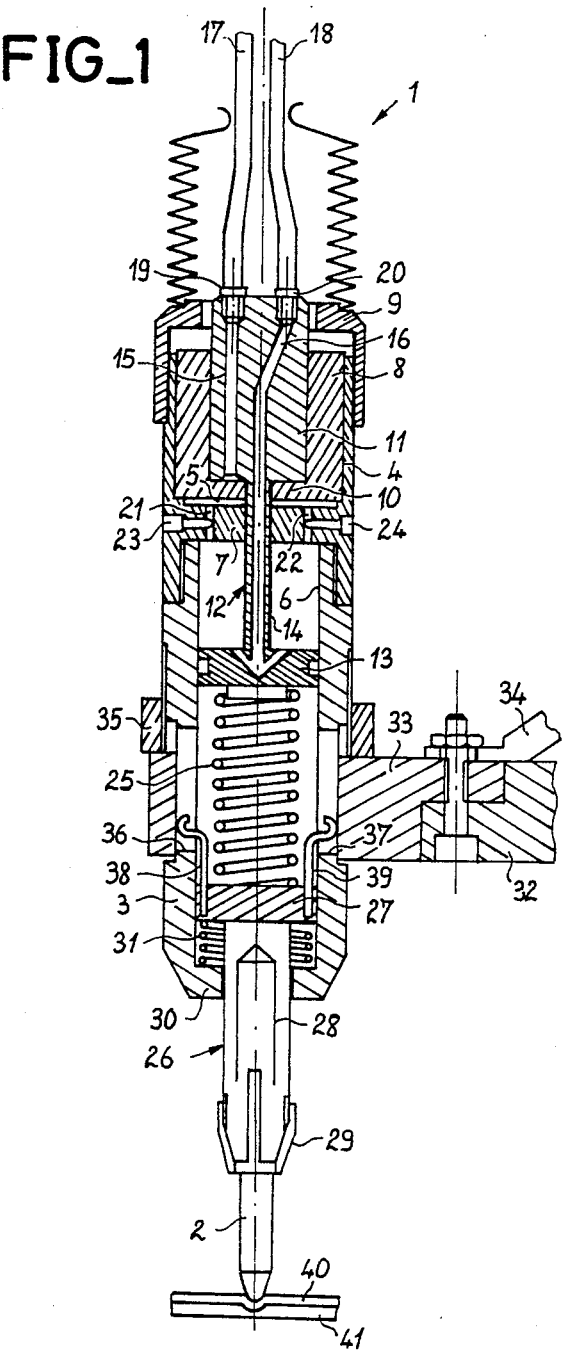
FIG_1

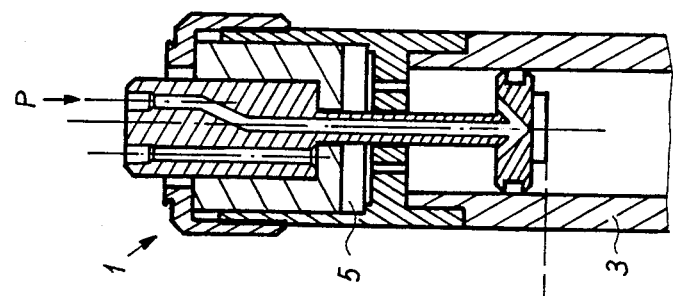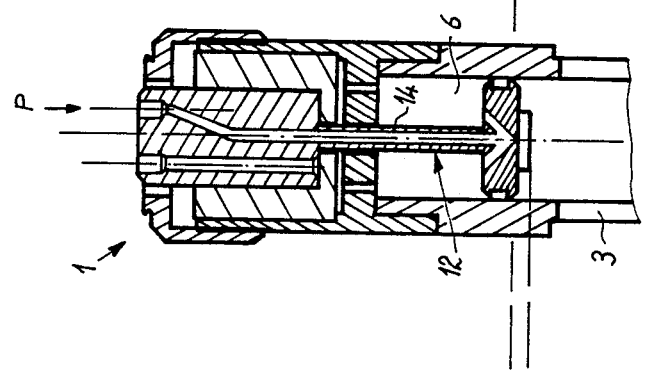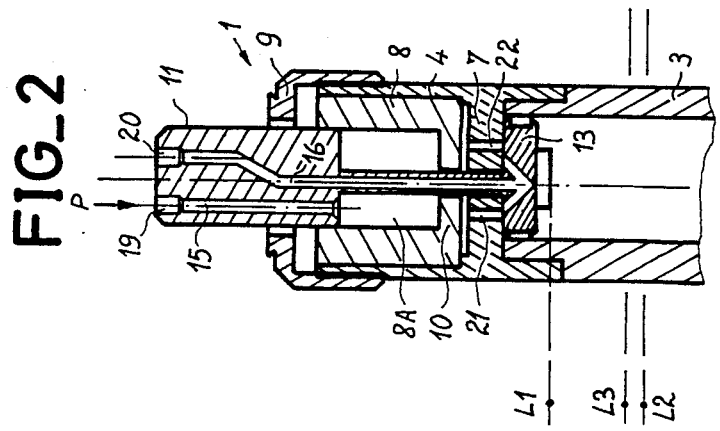

DUAL-PRESSURE JACK

BACKGROUND OF THE INVENTION

(1) Field of the Invention

The present invention pertains to a dual-pressure jack.

(2) Description of the Background

It sometimes happens, for example, in resistance spot welding, that two different pressures have to be successively exerted at one point of a material: one higher pressure to deform the material and the other lower pressure to hold the deformed part against the surface of another material during welding. Currently, for operations of this type, it is possible either to use different jack fluid pressures or to combine a jack with a cam-operated positioning device. In both cases, the apparatus used is a complicated and bulky one.

The object of the present invention is a jack which can be used to successively exert two different pressures at different positions of the outgoing rod of the jack, through only one control fluid pressure, using simple and compact means.

SUMMARY OF THE INVENTION

The jack according to the invention has a casing divided ianto two cylinders by a cross partition, with a first floating piston which moves in one of the cylinders and is shaped like a cylinder for a first part of a second piston, the second part of which moves in the other cylinder, the two parts of the second piston being linked to each other by a rod which passes through the said cross partition.

BRIEF DESCRIPTION OF THE DRAWINGS

The present invention will be better understood from the detailed description of a mode of embodiment which is taken as a non-exhaustive example, illustrated by the appended drawings wherein:

FIG. 1 is an axial cross-section of a jack according to the invention, and

FIGS. 2 to 4 are partial cross-sections of the jack of FIG. 1 in three characteristic positions.

DESCRIPTION OF THE PREFERRED EMBODIMENT

The invention is described below with reference to a dual-pressure jack used in welding, but it is clearly understood that the invention is not restricted to an application of this type.

The actuating fluid of the jack according to the invention may be pneumatic as well as hydraulic. Hence, in the following description, reference is made merely to "actuating fluid" without any other qualification. Furthermore, since the same jack is depicted in all four figures, the same elements depicted in the various figures have been assigned the same reference numbers.

Since the jack 1 is, in the present case, designed to actuate a welding electrode 2, its casing comprises a front part 3 (the electrode side) made of a mechanically resistant, insulating material and a metallic rear part 4, but it is understood that, in other applications which do not require electrical insulation, the casing of the jack can be made as a single, preferably metallic, piece.

The casing of the jack 1 is divided into two cylinders by a cross partition 7 formed in that part of the casing 4 which is close to its junction with the part 3. Two chambers 5 and 6 are formed in the cylinders of the parts 4, 3 respectively of the casing.

A first piston 8 moves in that part of the casing 4 which is between the partition 7 and a cylindrical threaded cap 9, one end of which is radially folded inwards; the cap is screwed onto the rear part of the casing 4, on its outer surface for example, as depicted in the drawing. This threaded cap 9 thus forms an adjustable stop for the piston 8.

The piston 8 is shaped like a hollow cylinder closed on its front side by a wall 10, and its internal volume determines another chamber 8A with the rear part 11 of a second piston 12. A front part 13 of second piston 12 moves in the part 3 of the casing, determining the chamber 6 with the partition 7, the two parts 11 and 13 of the piston 12 being linked to each other by a rod 14 which goes through the partitions 7 and 10 through completely sealed passages. The stroke of the piston 12 is limited during forward motion when the front side of the part 11 of the piston 12 comes to a stop against the wall 10 of the piston 8, this piston 8 being stopped against the partition 7, and it is limited in backward motion when the part 13 of the piston 12 comes to a stop against the wall 7. The part 11 of the piston 12 freely crosses the threaded cap 9. Of course the lengths of the piston 8 and the various parts of the piston 12 are such that when the part 13 of the piston 12 comes to a stop against the wall 7, the part 11 of the piston 12 does not completely emerge from the piston 8 and is still well guided within this piston 8.

In the part 11 of piston 12, a first bore 15 is, made parallel to its axis but at a distance from this axis. This bore 15 goes through the entire part 11. A second bore 16 is made which axially crosses the rod 14 and opens, on the one hand, into the rear side of the part 13, and, on the other hand, into the rear side of the part 11. In the present example this second bore 16, for reasons related to the space factor of the connecting posts 19, 20 of fluid conduits 17, 18, crosses the part 11 axially, along approximately half its length, and then recedes from the axis to open into the rear side of the part 11 at a point which is approximately symmetrical, in relation to the axis of the part 11, to the outlet of the bore 15. Fluid conduits 17, 18, are linked to the bores 15, 16 respectively through posts 19, 20 fixed to the outlets of these bores, on the rear side of the part 11. The conduits 17, 18, are linked, in a manner not depicted in the drawing, to a single source of actuating fluid which selectively sends the fluid to either of these conduits. Of course, it is possible to fix a direction-selecting device for solenoid valve fluid behind the part 11 and, in this case, to use only one fluid conduit for connection to the source. However, a device of this type would be a bulky one.

Two bores 21, 22, are drilled in the wall 7, making the chambers 5 and 6 communicated with each other. These holes can be blocked in varying degrees by means of adjustable needles, 23 and 24 respectively.

The front side of the piston 12 controls, by means of a helical spring 25, the electrode-holder 26 to the end of which is fixed the electrode 2. The electrode-holder 26 takes the form of a piston 27 which moves with minimum friction inside the casing of the jack 3. To the front side of this piston 27 is fixed a rod 28 which is provided, at its unattached end, with appropriate electrode-fastening means 29. A front cross partition 30 of the jack casing, which has an opening for the rod 28 to go through, acts as a support for a helical spring 31 set between this partition and the piston 27, around the rod 28.

The jack 1 is fixed to a support 32, made of an electrically insulating material, by means of an electrically conductive collar 33 which is linked by a cable 34 to a welding current generator (not depicted). The collar 33 clamps the casing 3 approximately at mid-length and works with an adjusting device 35 in the axial position of the jack with respect to its support. This device 35 may be an internally threaded ring which is integrally joined to the collar 33 (fixed during travel but capable of rotating around this collar) and is screwed onto the casing 3 which has an external thread at the position of this ring.

At the position of the collar 33, two rectangular openings 36, 37 are made in the casing 3. These openings extend along diametrically opposite generators of the casing. Two approximately shaped electrical contact strips 38, 39, fixed to the piston 27, go through the openings 36 and 37 respectively, and form a sliding contact on the internal side of the collar 33 which can be reached by these openings. Of course, the dimensions of the openings 36, 37, and the thickness (in the direction of the jack axis) of the collar 33 are such that electrical contact is provided between the strips 38, 39 and the collar 33 throughout the travel of the piston 27.

Various means can be used to provide electrical insulation between the piston 27 and the piston 12, for example, making the rod 14 and/or the part 13 of the piston 12 out of electrically insulating material, or at least by placing an insulating strip between the spring 25 and the part 13.

Referring to FIGS. 2 to 4, we shall now explain the operation of the jack 1.

In the idle condition (FIG. 2), the electrode 2 is in the upper position, the pressure P of the actuating fluid is applied to the post 19, the chamber 8A is at its maximum volume, the part 13 of the piston 12 being stopped against the front side of the wall 7 (position L1), and the piston 8 is in its low position.

In the operating condition (FIG. 3), i.e. when the electrode 2 must reach its lowest position, the pressure P is applied to the post 20 and makes the piston 12 come down until the part 11 comes to a stop against the partition 10. It does so, of course, on condition that the passage of fluid through the holes 21, 22, is smaller than the passage of incoming fluid flowing through the bore 16, a condition which can be easily fulfilled by suitably adjusting the screws 23, 24. The part 13 of the piston 12 is in the low position (reference L2 in the drawing). However, the fluid, in flowing through the holes 21, 22, increases the volume of the chamber 5 by raising the piston 8 until it comes to a stop against the ring 9. The part 13 of the piston 12 is slightly above its low position, reference L3 in the drawing. The "welding" position (FIG. 4) is then obtained, on condition of course that the active surface of the piston 8 is greater than the active surface of the part 13 of the piston 12, the fluid pressure P being constant throughout this process. To return to an idle position, it is enough to apply the pressure P again to the post 19.

Thus, in the example of the use of the jack 1 to actuate a welding electrode 2 in order to carry out the resistance spot welding of two metal strips or plates 40, 41 (the electrode 2 coming into contact with the strip 40), the piston 12, in coming down to the low position (FIG. 3) forces the electrode 2 to press and stamp on the two strips that have to be welded together at an almost localized zone, the upper strip 40 being, or course, pressed to a greater extent. The pressure, being then applied to the chamber 8A, raises the piston 12 slightly up to the welding position (in FIG. 4, the ascent of the piston 8 has been exaggerated for the greater clarity of the drawing). This ascent of the piston 12 reduces the pressure of the electrode 2 on the strips to be welded without, however, eliminating it (the spring 25 adds to this pressure), with the result that the convex side of the pressed area of the strip 40 stays well in contact with the slightly pressed concave area of the strip 41 while, around this pressed area, there is almost no contact between the two strips, or at least the contact is small enough to focus almost all the welding current on this pressed zone and, therefore, to concentrate the heated zone, thus making it possible to obtain high-quality, constant welding and to eliminate splashes of melted metal by enclosing the heating point between the convex part of the strip 40 and the slightly concave part of the strip 41. Furthermore, the fact that the pressure on the electrode 2 is diminished during the welding stage makes it possible to increase the electrical resistance between the parts to be welded and, hence, to work with a current of lower intensity and adjust the welding parameters more precisely. Owing to the decrease in the intensity of the welding current, the electrode 2 is less oxidized. Thus the electrode can be set more durably, and it will require less maintenance.

What is claimed is:

1. A dual-pressure jack comprising:
 a casing having first and second chambers formed therein, said first and second chambers being separated by a partition extending transversely of said casing, said partition being fixed with respect to said casing and having formed therein at least one first fluid communicating passage communicating said first and second chambers, and a rod-receiving passage;
 means for adjusting fluid flow through said at least one fluid communicating passage;
 a first piston slidingly disposed within said first chamber and having a cylindrical opening formed therein; and
 a second piston comprising a rod and first and second parts disposed on opposite ends of said rod, said first part of said second piston being slidingly disposed in said cylindrical opening of said first piston and defining a third chamber enclosed by said first piston and said first part of said second piston, said second part of said second piston being slidingly disposed in said second chamber of said casing, said rod being slidingly and sealingly received in said rod-receiving passage of said partition;
 said first part of said second piston having first and second fluid inlet ports formed therein, said second piston having formed therein:
  a first fluid inlet passage passing through said first part of said second piston and communicating said first fluid inlet port with said third chamber, and
  a second fluid inlet passage passing through said first part of said second piston, through said rod, and through a portion of said second part of said second piston, said second fluid inlet passage communicating said second fluid inlet port with a portion of said second chamber formed between said partition and said second part of said second piston.

2. A dual-pressure jack according to claim 1, wherein the effective cross-section for fluid flow through said at least one fluid communicating passage of said partition is smaller than the effective cross-section for fluid through said second fluid inlet passage.

3. A dual-pressure jack according to one of claims 1 and 2 further comprising a pressure delivery rod extending from said casing and a spring operatively interposed between said pressure delivery rod and said second part of said second piston.

4. A dual-pressure jack according to claim 1, further comprising a cap threadedly engaging said casing and comprising adjustable means for selectively adjusting and limiting the stroke of said first piston.

5. A dual-pressure jack according to claim 1, wherein the active surface of the first piston is greater than the active surface of the second part of said second piston.

* * * * *